(12) United States Patent
Coleman

(10) Patent No.: US 9,390,640 B1
(45) Date of Patent: Jul. 12, 2016

(54) DECORATIVE FLAG DISPLAY ASSEMBLY

(71) Applicant: Allen Coleman, Quakertown, PA (US)

(72) Inventor: Allen Coleman, Quakertown, PA (US)

(*) Notice: Subject to any disclaimer, the term of this patent is extended or adjusted under 35 U.S.C. 154(b) by 0 days.

(21) Appl. No.: 14/275,370

(22) Filed: May 12, 2014

Related U.S. Application Data

(60) Provisional application No. 61/821,847, filed on May 10, 2013.

(51) Int. Cl.
| F16M 13/00 | (2006.01) |
| G09F 17/00 | (2006.01) |
| E04H 12/32 | (2006.01) |
| E04H 12/22 | (2006.01) |
| F16D 1/10  | (2006.01) |

(52) U.S. Cl.
CPC ............ *G09F 17/00* (2013.01); *E04H 12/2215* (2013.01); *E04H 12/32* (2013.01); *F16D 1/10* (2013.01); *G09F 2017/0066* (2013.01)

(58) Field of Classification Search
CPC ..... E04H 12/2215; E04H 12/32; G09F 17/00; F16D 1/10; F16D 1/116
USPC .......................... 248/530; 116/173; 403/359.6
See application file for complete search history.

(56) References Cited

U.S. PATENT DOCUMENTS

| 4,343,449 | A  | * | 8/1982  | Osthus ............... E04H 12/2215 |
|           |    |   |         | 248/121 |
| 5,502,910 | A  | * | 4/1996  | Lucchesi .................... 40/607.06 |
| 6,015,122 | A  | * | 1/2000  | Qui ............................... 248/156 |
| 6,202,974 | B1 | * | 3/2001  | Rellinger ............... A47B 97/08 |
|           |    |   |         | 248/165 |
| 6,287,042 | B1 | * | 9/2001  | Eriksson ................. E04H 12/32 |
|           |    |   |         | 116/173 |
| 6,575,417 | B1 |   | 6/2003  | Krommenakker |
| 7,684,694 | B2 | * | 3/2010  | Fromm .................. F16M 11/14 |
|           |    |   |         | 396/376 |
| 8,177,185 | B2 | * | 5/2012  | Priegel .......................... 248/539 |
| 8,789,964 | B2 |   | 7/2014  | Lamm |
| 2004/0206860 | A1 | * | 10/2004 | Bolinder ....................... 248/156 |
| 2005/0272515 | A1 | * | 12/2005 | Hurley ................... G09F 17/00 |
|           |    |   |         | 473/173 |
| 2009/0013921 | A1 | * | 1/2009  | Yun ......................... G09F 17/00 |
|           |    |   |         | 116/173 |
| 2014/0068978 | A1 |   | 3/2014  | Lamm et al. |

* cited by examiner

*Primary Examiner* — Todd M Epps
(74) *Attorney, Agent, or Firm* — Clinton H. Wilkinson; Charles A. Wilkinson

(57) ABSTRACT

A large decorative flag mount is formed with a tubular interengaged support construction to provide sufficient stiffness with relative lightness and inhibition of rotation between the tubular support sections by providing a single axial groove pair to the interengaging surfaces of one or more of the tubular sections before interengagement of two sections to inhibit mutual rotation and wherein the invention is useful in preventing undesirable relative rotational wind induced movement between the tubular sections resulting in incorrect orientation of a flag display, and also including a handle and reinforcing member to aid in lifting the assembled mounting.

15 Claims, 6 Drawing Sheets

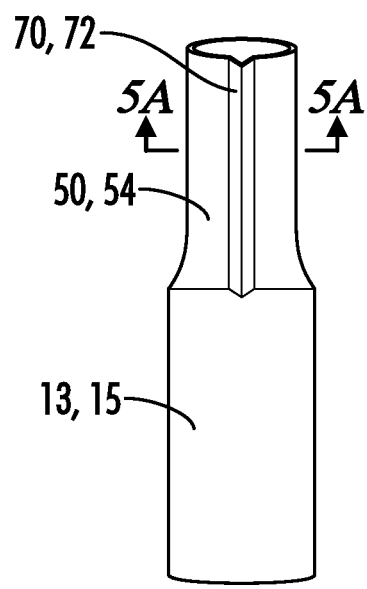
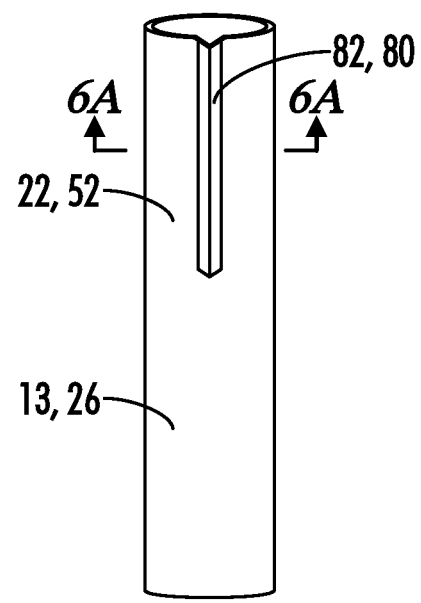
FIG. 5  FIG. 6
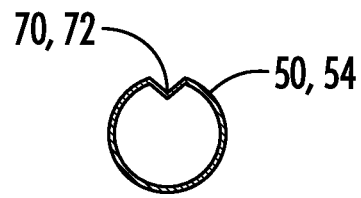
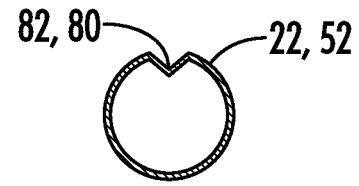
FIG. 5A  FIG. 6A

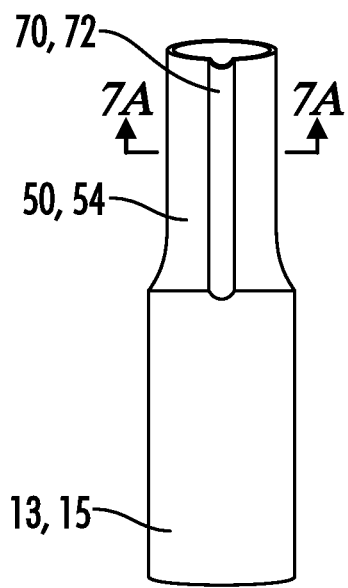
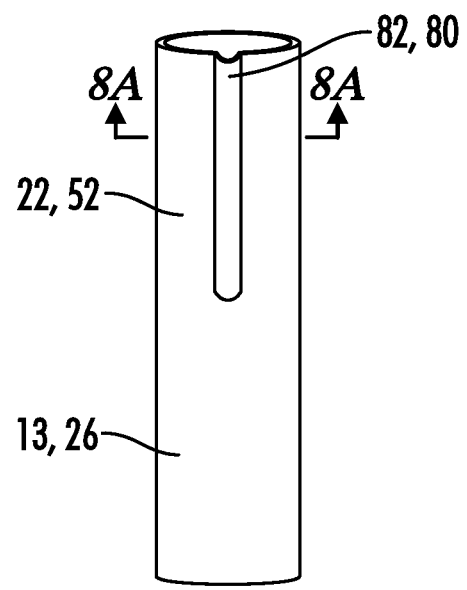
FIG. 7     FIG. 8
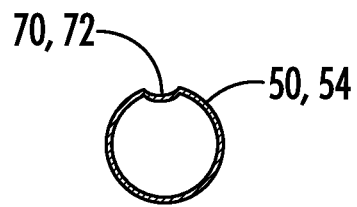
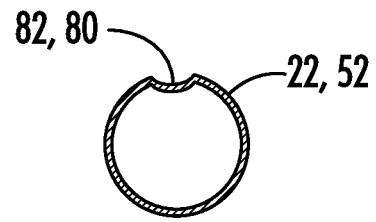
FIG. 7A    FIG. 8A

DECORATIVE FLAG DISPLAY ASSEMBLY

FIELD OF THE INVENTION

The present invention relates generally to the display of decorative flags, and more particularly to the display of large decorative flags supported on a ground support or mounting. More particularly, the present invention is directed to a multi-piece support hanger or mounting for display of decorative flags that resists rotation of the flag mounting due to wind forces and the like, and in addition having a reinforced ground engaging assembly that also serves as a handle member.

BACKGROUND OF THE INVENTION

Flags and banners have been used for centuries as decorations as well as identifying symbolic means of status, and particularly for identifying or symbolization of military units, ships, encampments and other official facilities and installations. Such flags have usually been either flown from supporting flagpoles or from shorter flagstaffs on vehicles and from windows, or flown from flagstaffs or flagpoles particularly designed to display such flag in an elevated and visible position. Flagpoles are usually substantially vertically oriented, while flagstaffs are angled with some elevation for visibility and to allow the flag to be lowered and removed during inclement weather as well as at night, essentially to protect the flag and make the flag last longer. Such protective handling has developed over the years into respect for the flag as a symbol, particularly as a symbol of a political subdivision, or for example, when used as a symbol of a country or state. The flags traditionally are made from cloth of varying degrees of substantiality, being subject to wear caused by wind which is frequently almost continuously moving or "flapping" the flag. Flags are also exposed even when elevated at some height to atmospheric soiling and degeneration of the cloth of which it is made by exposure to the elements including sun, rain and excessive wind, not to mention actual physical and chemical deterioration of its component fabric or fabrics.

While flags have frequently been also flown on short flag-poles or flagstaffs attached to buildings, and particularly upon short poles mounted in special brackets upon windowsills and the like, which short window display poles or staffs make the flag more evident to passersby rather than merely draping such flag out the window involved, it has not usually been convenient to mount these flags in place in relatively immobile, more visually evident positions. The use of small decorative garden flags has, however, in recent years become quite prevalent as a result of the development of corrosion resistant metal support hangers or mountings having a ground engaging end which can be merely pressed into the ground, and also having a crosspiece welded or otherwise secured to the top or opposite end of the vertical mounting support on which the flag is carried, which crosspiece stabilizes the directional display of the flag. The relatively small size of conventional stands or decorative garden flag mountings enables the ground engaging end of the vertical support or pole to be easily pressed into the ground for vertical support or mounting of a flag or banner in a "display mode." In modern usage, decorative garden flags are usually meant purely for decorative purposes or "to make a statement" concerning the displayer or owner which such owner believes is worthwhile making as a part, or expression, of such owner's personality, the great majority of modern decorative flags being displayed as an artistic statement or other statement of the owner's life rather than a statement of allegiance to a country or political subdivision.

It is desirable to orient the flag or banner supported on a garden flag mounting in a manner and at an angle whereby the content of the flag or banner is stretched out for good visibility at all times, rather than merely being flown from a pole and subject to being visible only from a position transverse to the wind and then only when the wind is sufficient to stretch out the flag. A prime consideration or desirable characteristic for a decorative flag is for it to be stretched out both vertically and horizontally, usually from its upper mounting edge and for it to be stretched out or unfurled by gravity from its upper attachment edge towards its other edges. Consequently, while customarily or traditionally politically oriented flags are "flown" or displayed from a flagpole, decorative flags are more frequently suspended, draped, or displayed from either an angled pole such as that attached to a windowsill or porch riser, or simply draped or depended from a window, but, as indicated above, a decorative flag as usage has developed is more usually displayed from a horizontal arm of a vertical support thrust into the ground in the garden of a residence or the like.

The horizontal support of a decorative flag may be and usually is a crosspiece extending from a vertical support. Since a horizontal arm extending from a round or other shaped small diameter vertical support pressed into the ground is likely to be twisted by wind force to extend away from the wind, depending upon the rigidity of the support, several different means have been developed to maintain the orientation of the support pole in the proper direction to retain the visibility the owner desires for the decorative flag. Display mountings for decorative flags typically comprise a weather-proof metal stake adapted for easy insertion into the ground because of limited cross section, with a horizontal crosspiece or metal member extending from near the top of the stake to which a flag may be draped or suspended. The supporting stakes usually have a U-shaped ground engaging section including a short horizontal member extending from the lower portion of the metal stake to the side and a vertical section depending downwardly from the outer end of the horizontal member that is inserted into the ground to the side of the supporting stake and usually directly under the horizontal metal member from or upon which the decorative flag is suspended. Very frequently, extra decorative metal ornamentation is added to the top of the support piece, or extra metal decorations are added to or about the upper flag supporting member to provide further decoration to the flag support as a whole. Such arrangement allows the decorative flag to be supported on the crosspiece with its lateral surface disposed in the direction it is intended to be displayed, with the amount of rotation available to the crosspiece being dependent primarily on the stiffness of the metal mounting material and how securely the mounting is supported in the ground surface.

The majority of decorative garden flags have been restricted in size because of the complications in adequately supporting a large exposure of flag in gusting or elevated winds, the force of the wind against a flag tending to increase geometrically rather than linearly with increasing wind velocity. Within the last few years, however, new larger decorative flags have been increasing in popularity and the decorative flag supporting means have by necessity been enlarged. Difficulties have been encountered, however, in scaling up the size of the supporting or mounting structure, particularly when its height becomes greater than three or four feet.

One of these difficulties has been that a single supporting post more than four or five feet in height becomes heavy and unwieldy to carry, ship, or transport. In addition, the provision of a rod stiff enough to withstand the wind force encountered becomes difficult to insert into the ground by ordinary downwardly directed hand pressure. It must also be kept in mind that decorative flag display products are to a considerable extent the subject of impulse buying by persons who just wish to buy the product, carry it home and set it up with as little assembly and overall effort required as possible. Special preparations or precautions are considered by the customer as definite negative factors which may be avoided or averted by simply not purchasing the flag display product in the first place.

It is not unusual, when confronted with the necessity of decreasing the length of a pole for shipping purposes or the like, to break such pole into one or more separate sections, which separate sections include a structure for securing the sections together, such as intermediate socket type fixtures or fittings, so that the sections may be pieced together in cooperating lengths to form a single pole. These socket arrangements may be formed of an outer tubular form on the end of one stake section and a solid or reduced tubular end on an adjacent or cooperating section. Various ways of retaining the two sectional lengths of decorative flag supports together have been practiced or adopted in the past, including insertion of a reduced tubular end having a lesser diameter into the larger diameter outer tubular form. However, much difficulty is encountered in connecting the supports together with a sufficiently close fit or tolerance that the flag support pole or crosspiece does not rotate with even light wind forces an unacceptable amount, without adding extra hardware to the supports, which is expensive and slows the manufacturing process.

The present inventor has developed an effective and practical solution to this problem. In one embodiment, tubular connected sections of the main, or mast, arm of the decorative flag support of the present invention are necked down at one end by any suitable physical process, such as a controlled swaging operation, for insertion into the open tubular end of an adjoining main mast section with a close fit. In addition, a single axial ridge is provided on both the swaged section and adjoining main mast section, which prevents the two sections from relative rotation with respect to each other when joined together and exposed to elevated wind pressures or forces. The tubular stacked sections also provide a sturdy appearing mounting pole upon which a wide angle cross section or metal piece can be mounted at the top and be supported without difficulty.

While it is desirable for the supporting pole to have a somewhat enlarged diameter so that mating cross sections can be securely mounted together, it is also desirable in at least one embodiment that the ground insertion section of the supporting pole be formed of smaller solid diameter stock that can be more easily driven or pressed into the ground. The ground insertion assembly may be formed in different ways, such as in one embodiment being comprised of a single solid U-shaped section formed of a crosspiece with two ground insertable leg members extending downwardly. Alternatively, in another embodiment the two ground insertion leg members may be physically separate members, one comprising the main or principal ground insertion member which is straight and extending in an overlapping manner with or from the support tube, while the other is in the form of an "L" shaped section welded to the bottom of the tubular section with a ground insertion member extending from the end parallel to the main or principal ground insertion member. Such ground insertion members in at least one embodiment may be spaced apart from each other about nine to fifteen inches, and in at least one embodiment the ground insertion members should be substantially parallel to each other to allow for convenient insertion into the ground.

Since the flag display elements of the present invention are intended to be easily assembled by a homemaker or the like, the pole elements should not only be easy to assemble, but also secure and sturdy enough to hold together and not pull apart as a result of exposure to wind or other atmosphere disturbances such as rain, sleet and hail, plus accidental impacts by objects thrown by children, lawn maintenance equipment, or the like. Fitted together tubular or annular elements have been frequently held together by detents of one form or another such as, for example, a ball mounted or held on one section and held in place by a cage or the like, or by a detent on the end of a section of spring metal which may be displaced to the side by sliding the other end into an orifice on the adjoining section. All these expedients, while simple, tend to add significant aggregate cost to the structure, and also to corrode relatively quickly in outdoor environments. The present inventor's arrangement, however, does not require any such additional holding elements, although as discussed below in at least one embodiment the lower ground engaging section and center section of the tubular mounting may be secured together by an additional screw type fastener to prevent these two sections from pulling apart when the mounting is gripped and pulled or forced upwardly to remove the stake from engagement with the ground surface.

In addition, the solid metal ground insertion rod assembly, welded or otherwise attached to the lowest tubular mast extension for support of a decorative flag by insertion into the ground is, in accordance with the larger scale of the decorative flag supporting assembly of the present invention, in one embodiment provided with a diagonal brace passing or extending from the end of the ground insertion structure and attached to the lowest or bottom tubular mast section. This brace has proven to be also a convenient handle for use both in pressing the ground piercing member into the ground as well as a handle for manually removing the assembly from the ground when it is desired to move the flag mounting from its location in a garden setting or environment. Such diagonal bracing has unexpectedly been found, therefore, in one embodiment to constitute a major improvement in the structure of the decorative flag mounting construction of the invention.

The present inventor has therefore found, at least in the provision of extended sections of overlapped tubular stock for the provision of elevated mounts for decorative flags in garden environments, that the conventional complicated or involved detents for holding overlapped metal tubular members together is unnecessary, and furthermore, not only are the usual multiple arrangements for interlocking detents to hold two overlapping sections of tubular stock together not necessary or desirable, but that instead a simple swaging or cold deformation of an outwardly facing surface that is to be secured within a matching inwardly facing surface and including a single pair of matching axial ridges will be very effective in preventing circumferential movement between the two matching surfaces. It has been further found surprisingly that since the two circumferential surfaces are fairly tightly fitted together in any event, that the placement of an axial groove in or upon the inner fitting surface, or, for convenience in swaging, the outwardly facing surface, is very effective in preventing the inner circumferential construction from rotation in the outer circumferential construction, because the axial groove has been essentially marked or swaged in a transcircumferential direction or across or crosswise to any such transcircumferential direction or movement such differential rotation between the circular pieces can be substantially inhibited. Even further, the present inventor has discovered that only a single axial groove is required for this purpose, and in fact that the provision of additional axial grooves reduces the effectiveness of this arrangement.

In general, close fitting circular sections are seldom removed from each other by a straight pull in opposite directions. Rather, the usual movement or procedure is for the two sections to be moved circumferentially in small increments whether such movement is caused by wind pressure or by hand or circumferential tool force. As the two sections are differentially moved with respect to each other circumferentially, they also tend to slide longitudinally with respect to each other. When the force is removed, the sections will be found, if examined minutely, to have slid apart slightly, and with or upon the next force being applied, the two pieces will be found to have slid even further apart as minor differential rotation was effected. By the law of averages, therefore, over a period a series of incrementally applied forces will tend to differentially work an outer circumferential member in a direction which will steadily twist and remove an outer member from engagement with an inner member until the two become completely disconnected. Alternatively, even if the sections do not tend to move longitudinally with respect to each other, they will tend to do so with less force if exposed to a rotational force simultaneously with a longitudinally exerted force. The cure for disconnection of an outer surrounding member from an inner included member, therefore, is to prevent circumferential movement of the outer member on or with respect to the inner member. As explained above, the present inventor has realized that this phenomenon may be taken advantage of by the expedient of applying a single axial groove to the inner and outer members of interengaging circumferential members, whereby the simple expedient of providing an axial groove on the joined surfaces of the inner and outer connecting members is surprisingly easy and practical and has solved a serious problem in a simple and expeditious manner.

DESCRIPTION OF RELATED ART

Several flag stake assembly types are known to the present inventor and/or are currently available in the marketplace. In one type, the sections are threadably connected, whereby, for example, in one arrangement a three section flag stake may have a solid rod top section welded to a short internally threaded tube, which then joins to a threaded rod center section to which a short tube is welded on the bottom with an internally threaded insert to join with a threaded rod of the bottom section to insert into the ground. In another arrangement, a more sturdy and lighter weight alternative replaces the rod sections with tubular sections that have press fit inserts with mating male and female threaded screw connections. Threaded connections provide little resistance to rotation from torsional forces exerted by the wind. Rotation between sections causes the flag to reorient itself in a direction not desired. Threaded connections also open up to allow corrosion and may eventually come apart altogether. Both of the above types of threaded connections complicate production and are costly to produce. Another type uses radially inserted screws or cotter type retaining pins which are inserted through mating holes to join the sections together. Although simpler to produce than threaded connections, radial screws or retaining pins allow moisture penetration. Such connections usually fail from sheer caused by torsion induced from high wind gusts. In addition, they complicate assembly because tools are required to join sections together.

While there have, therefore, been multiple attempts to develop widely applicable devices and methods for the display of large decorative flags in garden settings and the like, none includes the advantages contained in the present invention, which is easy to assemble without tools, less complicated and therefore less expensive to produce, and also holds up to the stress of harsh weather, and is not subject to moisture penetration and corrosion.

SUMMARY OF THE INVENTION

In view of the foregoing complications with known mounting devices and supports for decorative flags, the present invention provides a superior flag mounting for large decorative flags for placement in garden locations or the like. The framework type flag mounting is provided with a construction that makes it particularly easy and convenient to set up and retain as well as more convenient for shipping and transport from one location to another. Improved construction of parts of the mounting provides a superior mount at a more competitive cost than heretofore available. In at least one embodiment, the invention involves the provision of a sectional or multi-piece flag mounting or stake in which single axial groove pairs are positioned in matching inner and outer interfitting end surfaces of the pole sections, to substantially prevent rotation between the interfitting surfaces which might occur due to wind forces and the like. The invention in one embodiment also includes a bracing member connecting between the mounting pole and the outer end of a side deviating ground insertion construction which also serves as a handle member for manually removing the flag stake from the ground.

It is therefore an object of the present invention to provide a sturdy yet practical mount for large decorative flags for secure mounting of such type of flags in a typical suburban garden or yard.

It is a still further object of an embodiment of the invention to provide a mounting for large or oversized decorative flags in order to mount said oversized decorative flags in a garden or the like which is both easy and efficient to assemble, and which mounting is both strong and effective in mounting such flags, while also being inexpensive and attractive.

It is a still further object of an embodiment of the present invention to provide a mounting for a large or oversized decorative flag which is sturdy and efficient in supporting such a flag in an outdoor environment, but, is also inexpensive and convenient for a customer to purchase and set up in a home garden.

It is a still further object of an embodiment of the present invention to provide a mounting for decorative flags which can be more effectively fabricated and is more effective for its intended purpose than previously available designs.

It is a still further object of an embodiment of the invention to provide a more effective and easier flag mount for oversized decorative flags.

It is a still further object of an embodiment of the invention to provide an effective mounting for a large or oversized decorative flag which can be provided at a reasonable production cost.

It is a still further object of an embodiment of the invention to provide a new method and arrangement to produce a multiple section metal pole in which the individual sections are inhibited from rotation with respect to each other by providing the interengaging sections with a single axial groove which provides a mating ridge arrangement on the interengaging sections.

It is a still further object of an embodiment the invention to inhibit rotation of connected interfitting pole or shaft sections by swaging the outer interfitting surfaces of such sections to inhibit one section from rotation with respect to the other.

Other objects and advantages of the invention will become evident from a careful review of the following description and appended drawings

BRIEF DESCRIPTION OF THE DRAWINGS

FIGS. 5-5A and 6-6A are disassembled and cross-sectional views of a joint portion of the supporting mast to be assembled into overlapping joint and illustrating an embodiment of an axial groove pair.

FIGS. 7-7A and 8-8A are respectively disassembled and cross-sectional views of a joint portion of the supporting mast to be assembled into overlapping joint and illustrating another embodiment of an axial groove pair.

DESCRIPTION OF THE PREFERRED EMBODIMENTS

Figure 1:
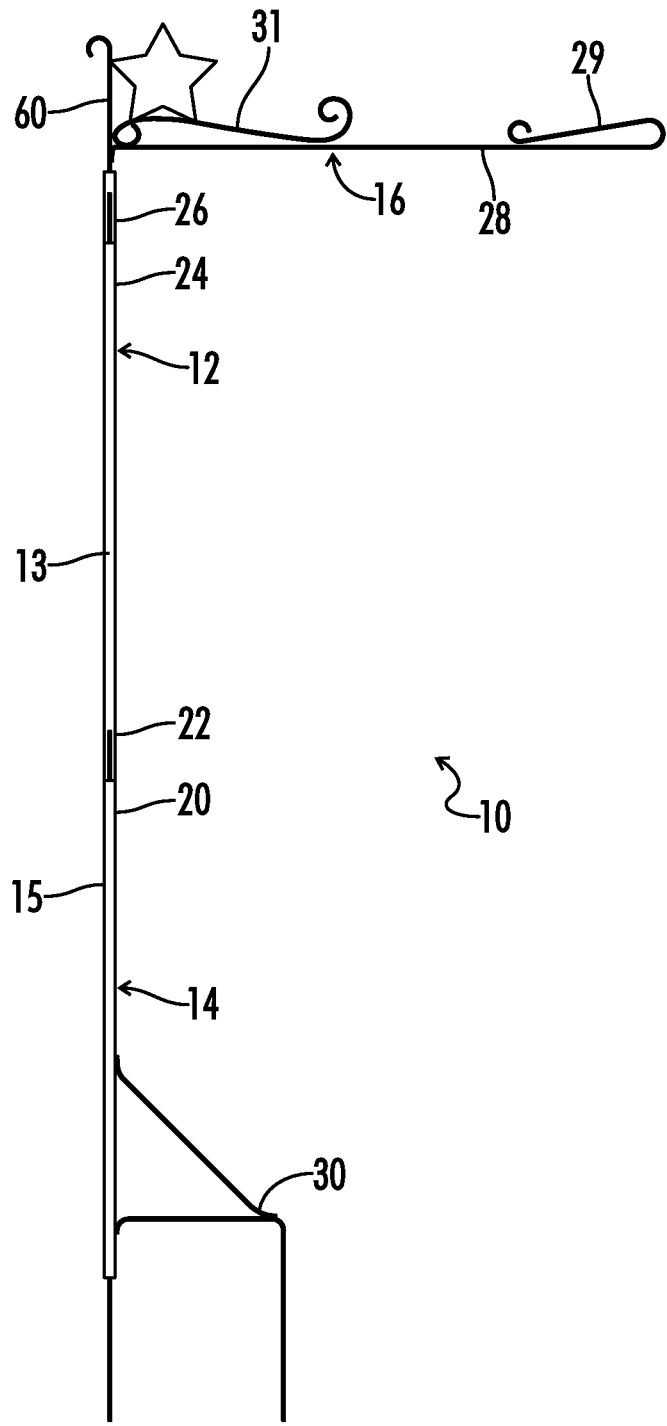
FIG. 1 is an expanded view of an exemplary embodiment of an assembled flag mounting of the invention in accordance with provision for the support of large decorative flags in a garden environment.

The following is a detailed description of the best mode or modes of the invention presently contemplated. Such description is not intended to be understood in a limiting sense, but to be an example of the invention presented solely for illustrative purposes thereof and by reference to which in connection with the following description and the accompanying drawings one skilled in the art may be advised of the advantages and construction of the invention as well as some limited variations thereof.

Supports, or display mountings, for so-called decorative flags are not without difficulty in design and construction because of the exposure of such flags to constant changes in the prevailing weather, including rain, snow, strong or gusty winds plus sudden changes in temperature and the like. Such flags should furthermore be easily mounted or attached to or upon the flag mounting as well as be removable therefrom for the potential mounting of a substitute flag. The mounting should also not have any sharp points which might rip the flag if such flag is picked up by the wind from its draped position and deposited against the mounting upon or against any such points. Flag mountings are typically provided as either a single solid piece, or if provided in a plurality of sections, the sections of the flag mounting should be easily assembled and disassembled for handling and transportation from one place to another and for merchandizing, display and purchase. In addition, the various disassembled sections of the mounting construction should be easily packaged in a sturdy container or package of some convenient form.

Decorative flags are available in a variety of sizes, but typically range from a smaller size of about twelve inches by eighteen inches to a larger size of about twenty-eight inches by forty inches, although there are of course other sizes and shapes available plus special ordered sizes and shapes. Decorative flag mountings for smaller size garden flags are usually manufactured in single units, or in one piece, with a sharp ground insertion end and a top cross piece section from which a decorative flag is hung. However, when the scale or size of the decorative flag increases, the requisite length of the mounting or support rod is increased, such as, for example, having an assembled size of about thirty inches wide and about eighty inches high, with an in-ground height of about sixty-eight inches, so that the lower edge of the flag is about twenty-eight inches above the ground. A drawback of larger flag mountings is that they become too long or unwieldy for convenient shipping, carrying or handling up to the time the mounting is ready to be inserted into the ground, especially for the "distaff" side of a marriage, which distaff side, or half of a marriage, usually conducts major portions of the purchases for family units and frequently, and usually preferably, carries such purchases away from the place of purchase to the home where they are to be used or displayed to other persons. Thus, the particular method or arrangement for connecting relatively long members which are to be used connected together becomes an important aspect of such products as may be used in a residential environment.

It is relatively easy to make two tubular members conveniently attachable together by inserting a necked down end section of one such tubular member or piece into a full sized center opening in the end of the other section or piece. Difficulty is encountered, however, in providing the one section to be inserted into the other section with a sufficiently tight fit to prevent a flag mounting from twisting or rotating in the wind and the like, since if the fit is too tight it will be very difficult if not impossible for the purchaser to manually initiate connecting of the pieces and then continue to force the one into the other. To insert one member into the other, the pieces must be precisely aligned with respect to each other, with both being within a critical same circumferential alignment as well as longitudinal alignment, since even minor misalignment in the longitudinal alignment of the parts when cross sectional sizes are very similar will be effective to make the parts virtually impossible to mount together manually. It can therefore be very difficult to insert close tolerance similar inside and outside diameter members one within the other, not to mention completely frustrating to purchasers.

One solution to such difficulty is to make the parts with sufficient radial difference between the dimensions so that the smaller will easily slide into the larger. If the fit is made looser, however, the inner member is too easily withdrawn from the outer member, and in addition the flag mounting will twist or rotate in the wind an unacceptable amount. For example, if with known flag mount or support arrangements the connection between two pieces is loose enough to be easily pressed one into the other, gusts of wind will tend to twist the inner or smaller diameter member with respect to the outer member, not only allowing the flag to rotate or twist but also causing wear and stress and eventually failure of the connection. In addition, over time the smaller diameter member will tend to be pulled from the larger diameter member, so that over a period of small increments of pulling apart as a result of repeated wind blasts, without the use of an additional holding member eventually the two pieces may completely extract the inner section from the outer and the connection will fail.

Where an invention comprises a series of tubular elements that are to be mounted together to form an elongated unit, the separate elements of which can be inserted together at their ends to form a longer construction, it is conventional or known to provide detents of which there are different types that can be relied upon to hold adjacent sections together while in use. These may be referred to as absolute detents, since they work in effect by tying two movable sections together or interlocking them by passing a third piece at least partially through both pieces. A conventional arrangement for preventing two tubular members from coming apart is to provide a locking means in which the detent is in the form of a small insertion of a pin or ball or the like through one part into the other. Typically the pin or ball will be mounted upon one unit, usually the inner unit, which detent is urged outwardly by a force such as spring pressure to pass through at least a section of the outer unit or at least partially into the other inner unit and to be retained there by the continuous laterally directed force to in effect lock the two sections together until the interlock is released. Such relatively sophisticated locking mechanisms, however, while structurally simple, are relatively expensive when applied on a mass scale, do not prevent the units from rotational movement due to wind forces, allow rain or other atmospheric moisture to accumulate in the openings, and overall tend to deteriorate or fail relatively quickly.

The present inventor has discovered, however, that by forming a single axial groove on a reduced diameter section of the end of a first member to be inserted into the inner diameter of a second member, and applying a corresponding or mating axial groove along the open end of the second member, a tolerance sufficient to prevent wind derived forces from causing unacceptable levels of rotational movement between the two members results, while also enabling insertion of the swaged end of the first member into the open end of the second member to be performed relatively easily from the perspective of the purchaser, as well as preventing one engaged member from working out of secure contact with the other, at least in the case of two radial sections inserted one within the other by external force. Such swaging and axial groove manufacturing process has been found quite surprisingly to be unexpectedly effective to prevent loss of interengagement and rotational stability in large decorative flag mounting apparatuses or support assemblies as compared to prior art assemblies.

A further significant improvement in an embodiment of the large decorative flag mounting of the present invention is the provision of a diagonal combined brace and handle or brace-handle extending from a ground piercing unit comprising a side mounted piercing unit and the bottom tubular section. Since the ground insertability of the end of a tubular structure having an open end is difficult, construction of the large decorative flag mounting of the present invention makes use of a tripartite ground piercing end arrangement in which a solid straight ground piercing unit or assembly is used at the end. In one embodiment, a solid ground piercing unit is inserted into the end of the tubular section and welded within the tube with the pointed end of the ground piercing rod extended straight downwardly. At the same time, a side construction of a ground piercing means is extended to the inside and welded to the side of the bottom of the side of the tubular member and bent outwardly to extend for eight to twelve inches to the side, at which point it curves or makes a substantially right angle turn downwardly and extends further downwardly about one foot to or about a position approximately opposite the end of the ground piercing metal section extending from the bottom of the bottom tubular section. Thus, when the bottom tubular section of the flag support as a whole is pressed downwardly toward and into the ground, the two solid ground piercing sections will be forced into the ground at their lower end to support the lower tubular section of the flag mounting plus further more elevated tubular sections of said flag mounting which are supported thereupon.

The top section of the tubular construction may be relatively short and has a side arm welded to it at a right angle. The two ends of such side arm are bent over whereby the ends are bent or twisted into a curved configuration with an intermediate section twisted back upon itself. As will be clear to those skilled in the art, the bend in the outer ends of the curved sections brings the two parts close enough together so that the engaging sleeve at the top of a decorative flag can pass over the two outer sections and then under the outer angled portion at the inside of the supporting extension with the outer section of the sleeve in this case passed under the bent or curved end. This provides a very secure yet easily disengaged attachment of the flag to its mounting or the flag mount as a whole.

As indicated, the length of the top section of tubular construction may be relatively short or if a higher mast is desired can be made considerably longer. Thus, the height of the particular flag mast can be conveniently governed by the length of the top mast element which may be supplied as several interchangeable elements. Alternatively, the height may be determined by the middle or by the central mast section combined with the top section.

Figure 2:
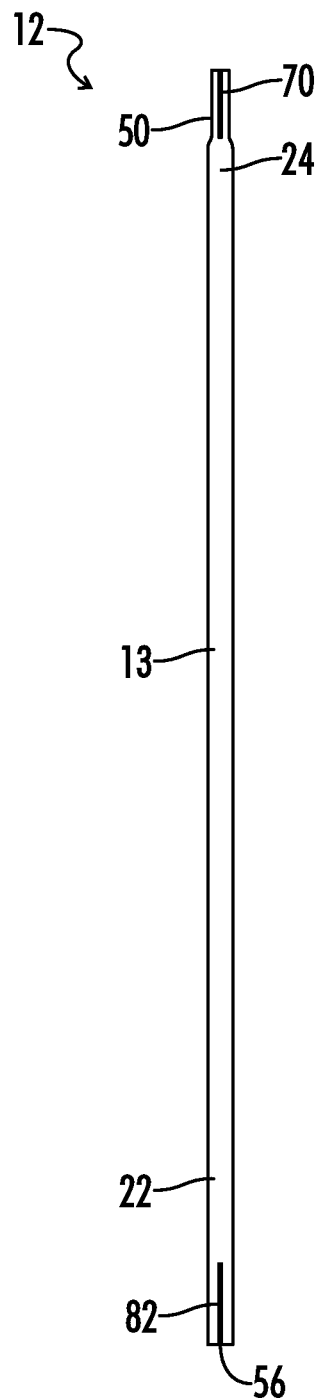
FIG. 2 is an expanded view of the center section of the mounting of the invention.
Figure 3:
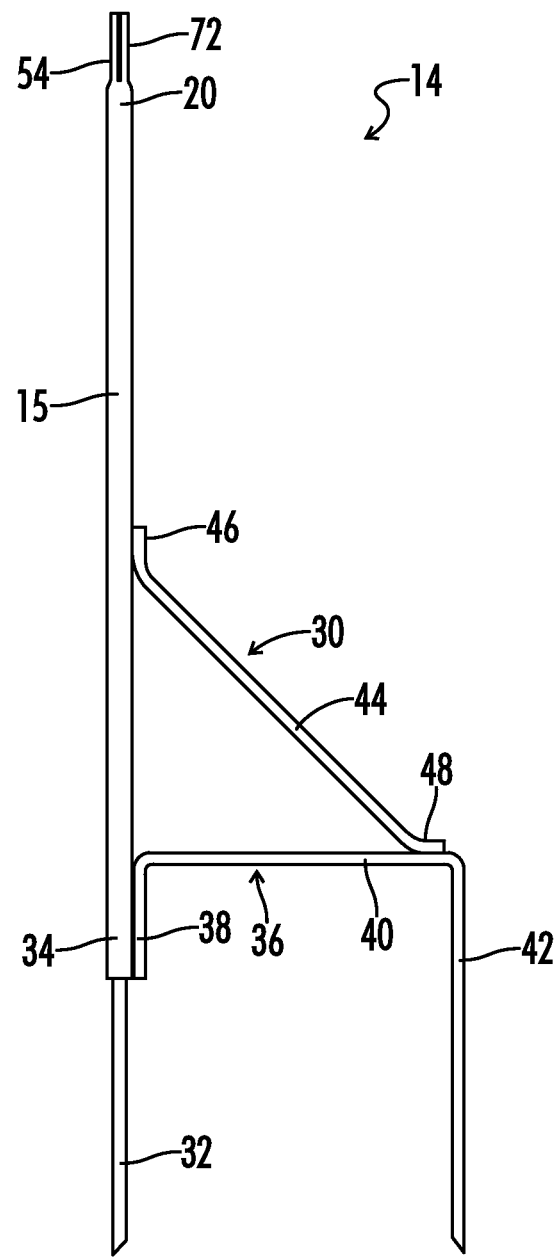
FIG. 3 is an expanded view of the lower or bottom ground piecing or support section of the invention.
Figure 4:
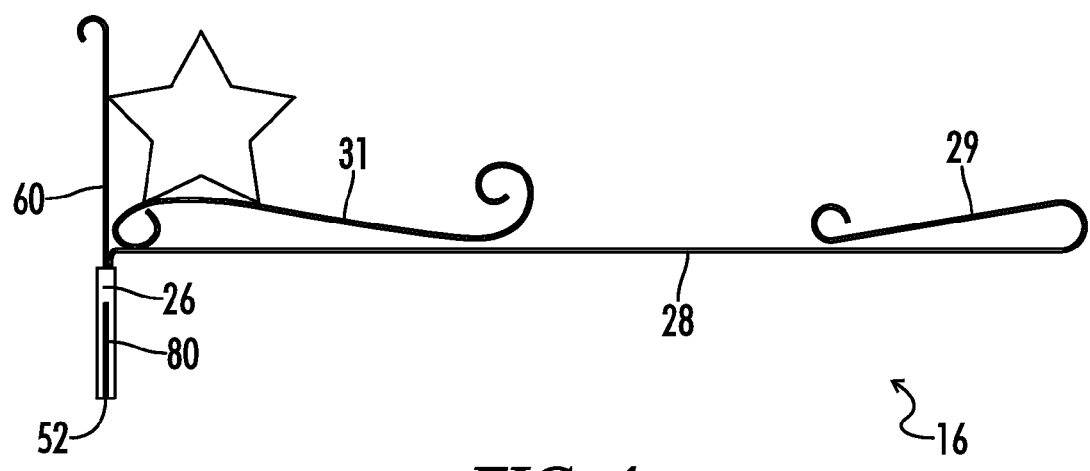
FIG. 4 is an expanded view of the upper flag support of the invention.

An embodiment of the invention as described above is shown in the attached drawings, beginning with FIG. 1 which is an overall view of the modular flag mounting 10 of the invention in a completely assembled form, while FIGS. 2-4 illustrate separately the three interconnectable or interfitting pieces or support shaft sections of mounting 10, namely a central extending or middle section 12, a ground engaging section 14 and a flag mounting section 16. Ground engaging section 14 includes shaft 15 which is securable on its upper end 20 to first end 22 of shaft 13 of center section 12 in the manner to be described, while second end 24 of middle shaft section 13 is similarly securable to the shaft section 26 of flag mounting section 16. Flag mounting section 16 also includes a laterally extending or transverse flag support arm 28 having a rearwardly curved end section 29 and inner holder section 31. In addition, a ground support assembly 30 is secured to the lower end of shaft 15 of ground engaging section 14 of mounting 10 such that when assembly 30 is engaged with a ground surface, support mounting 10 and a flag connected to flag support arm 28 are in an upright or substantially vertical orientation. In a preferred embodiment, for purposes of weight, strength and convenience, shaft sections 13, 15, and 26 are comprised of a tubular material such as a metal tubing, while flag support arm 28 and ground support assembly 30 of flag mounting 10 are comprised of a smaller diameter solid metal wire or steel bar material. In one embodiment, the metal tubing has an outer diameter of about 0.76 inches and an inner diameter of about 0.63 inches, and the metal wire has an outer diameter of about 0.375 inches.

Referring now in particular to the closeup view of ground support section 14 in FIG. 3, ground support assembly 30 includes a first ground insertion or piercing rod 32 which is connected preferably by welding extending downwardly from the lower end 34 of shaft 15. In one embodiment, an end of rod 32 is inserted into the open lower end 34 of shaft 15 a distance of at least about ½ inch prior to welding in such position. In addition, assembly 30 includes an inverted U-shaped member 36 having a short link section 38, a horizontally disposed link section 40, and a downwardly depending section which forms a second ground insertion or piercing rod 42. Member 36 is connected to the lower end 34 of shaft 15 in one embodiment by welding of short link section 38 to the outer surface of lower end 34, with link section 40 extending outwardly from shaft 15 and short link section 38 generally at a right angle with respect to the longitudinal axis of shaft 15 and link section 40, while second ground piercing rod 42 is disposed at substantially a right angle with respect to section 40 and substantially in parallel with and spaced apart from first ground piercing rod 32. As a result, lower section 14 of flag mounting 10 includes two solid ground piercing rods, the first 32 which extends straight downwardly into the ground from the lower end 34 of the tubular shaft of flag mounting 10 when in use, and the second 42 which is positioned to the side by link section 40 for entrance into the ground at a spaced apart position from the first rod 32. First and second ground piercing rods 32 and 42 each preferably have an angled or sharpened end surface, and in one embodiment are spaced apart a distance of between approximately six and twelve inches, while in another embodiment the ground piercing rods 32 and 42 are spaced apart a distance of about nine inches.

In addition, in an embodiment bar 44 is connected also preferably by welding extending diagonally, in one embodiment at approximately a forty-five degree angle, between shaft 15 at a position spaced apart from lower end 34 on its first end 46 and to link section 40 on its second end 48 at a position spaced apart from short link 38. Ends 46 and 48 are preferably angled to be substantially in parallel with shaft 15 and link section 40, respectively, to facilitate welding. Bar 44 comprises a further significant improvement of decorative flag mounting 10 in comparison to known mountings, in that it serves a dual purpose as a combined brace for supporting U-shaped member 36 and stabilizing mounting 10 as a whole, and in addition serves as a handle member which is gripped when pulling or removing prongs 32 and 42 from the ground. In one embodiment, mounting 10 is constructed such that bar 44 is aligned with upper flag support bar 28 when flag mounting 10 is assembled, which configuration further aids in stabilizing flag mounting 10. It is difficult to remove mounting 10 from a garden by pulling upwardly on shaft 15 alone, since prongs 32 and 42 extend downwardly into the ground surface at spaced apart positions, which positions are preferably at least eight to twelve inches apart. Thus, prong 32 will tend to pull out first while prong 42 remains in the ground surface, causing the purchaser to have to twist the mounting 10 at least several times before it is completely disengaged from the ground surface, which could damage or bend the mounting structure and also cause damage to or dig up the garden. However, by manually gripping bar 44 at a position which is in-between prongs 32 and 42, such prongs can be pulled upwardly with a generally more equal amount of upward force, rather than the majority of such force being applied to prong 32, so that the mounting can be pulled directly upwardly and therefore disengaged from the ground surface more easily and without causing damage to the garden or device itself.

Referring now more particularly to FIGS. 2 and 4, shaft 13 of center section 12 has a first end 22 and a second end 24. Second end 24 has a necked down or swaged portion 50, which in one embodiment has a length of at least about two inches, and which necked down or swaged portion 50 is also sized to be snugly inserted into the open end 52 of tubular shaft 26 of flag support section 16, thus connecting shaft 13 of central section 12 and shaft 26 of flag support section 16 together in substantial axial alignment. In addition, as shown in FIG. 3, a necked down or swaged portion 54 is provided on upper end 20 of shaft 15 of ground engaging section 14, for the purpose of enabling necked down portion 54 to be similarly inserted into the open end 56 of first end 22 of tubular shaft 13, securing central section 12 and ground support section 14 of flag mounting 10 together also in substantial axial alignment. Open end 56 on first end 22 of shaft 13 and open end 52 of shaft 26 each has an inner diameter which is dimensioned to snugly receive the corresponding necked down portions 54 and 50, respectively, in order to form an overlapping joint between the connected sections of flag mounting 10. Alternatively, it will be understood that shaft 15 of ground engaging section 14 can have an open upper end 20 with an inner diameter suitable for receipt of a necked down first end 22 of central section 12. Likewise, shaft 13 of center section 12 can have an open second end 24 into which a necked down portion of shaft 26 of flag holding section 16 can be passed, the length of which shaft section 26 is relatively short but can be varied depending on need. However, having the outer section on the upper end or oriented downwardly is preferred because gravity will tend to continually urge the outer section to jam on to the inner section, further decreasing the likelihood that the sections will come apart.

In the embodiment shown in FIGS. 1-4, flag support section 16 includes a wire rod 60 connected extending upwardly from short shaft section 26, a short section of about ½ inch of which rod 60 is inserted in the upper end of shaft 26 prior to being secured together by welding. In addition, a short end piece of transverse flag support arm 28 is bent at a right angle and connected also by welding to rod 60 near shaft 26. In an alternative embodiment, the inner bent end of flag support arm 28 may be inserted into the upper end of shaft 26, while in another embodiment the ends of support arm 28 and rod 60 may both be inserted into the open end of shaft 26 prior to welding, as described below. As indicated above, flag support arm 28 includes a means for securing a decorative flag on support arm 28, and which in FIG. 4 comprises a rearwardly curved flag retaining section 29 which extends over the outer portion of arm 28, in one embodiment at a gradual downward angle. Retaining section 29 is relatively closely spaced from arm 28 to allow the sleeve portion of a conventional garden flag sized for use with the present invention to be slipped over and then underneath retaining section 29 on to support arm 28. An additional decorative retaining arm 31 is also provided, which as shown is connected to both flag support arm 28 near wire rod 60, and directly to wire rod 60 at a position spaced apart from shaft 26. Together, rearwardly curved retaining section 29 and decorative retaining arm 31 prevent a flag placed on and hanging from flag support arm 28 with its sleeve positioned between arm 28 and retaining sections 29 and 31 from being easily displaced from the support arm as a result of conventional wind forces and the like. In addition, the retaining arms 29 and 31 fulfill a decorative function, as they may be provided in a wide range of different shapes or configurations such as the "star" in FIG. 4. It is believed there is significant benefit in making shaft section 26 fairly short in order to attain better balance of the overall flag mounting structure including the extended flag supporting arm 28 with respect to the combined weight of arm 28, retaining arms 29 and 31, and a decorative flag supported thereupon.

To this end, the flag supporting arm 28 may be referred to as recursive because it tends to curve significantly back upon itself at one or both ends. This can also be referred to as scrolling if the recursive aspect is decorative. Such scrolling is, in the embodiment shown in FIG. 1 provided with a relatively high scrolling section which is shown basically larger on the mast side of the arm. This arrangement, in combination with a particular flag construction made for such arrangement or for use with this particular mounting provides for a particularly convenient manner of mounting large flags upon the flag mounting 10 of the invention. Namely, if a flag is provided with a sleeve at the mounting or upper end of such flag, conveniently formed by turning over and securing the top edge of the flag to form a tubular section having an effective width sufficient to slide over the lower scrolling arrangement or rearwardly curved arm section 29, such tubular end of the flag may be passed over such scrolling and under the higher scrolling or decorative retaining arm 31 at the other end and then, after clearing the lower scrolling, pulled back or straightened out and passed under the opposite lower scrolling, at which point one side of the end of the flag will be under the scrolled section at one end of the straight flag supporting section and the other side will be under the scrolling at the other end. This provides a quite secure attachment of the flag to the mast mounting as a whole which, however, can be easily reversed to remove the flag if such removal is desired. In addition, the flag arm design eliminates the use of clips or rings that would otherwise be required to attach the flag. In addition, even though securely held on the flag arm, the flags may be quickly and easily slid off and replaced with a different flag using the described arrangement.

The arrangement described is particularly useful to supply support and balance, particularly when a large flag is mounted upon the flag supporting arm 28. Flag supporting arm 28 in one embodiment is formed of round or rounded bar stock having a diameter suitable for support of the flag. In one embodiment, the side arm stock has a right angle bend in it the end of which is inserted into the open top of the shaft 26 of tubular stock forming the mast section together preferably with a second upwardly protruding section, or coinsertion, of the same stock preferably having a decorative curve or scroll shape at the end to form a decorative finish or simple scroll at the top. The insertion of the two stock sections into the top of the tubular section together with solder or other welding compound during construction or fabrication tends to serve to reinforce the top of the mast as well as exclude excessive moisture from the top of the assembly.

Since a definite effort is desirably made to prevent the lower or ground engaging section 14 of the flag mounting 10 of the invention from rotating in the ground so the flag will maintain a particular orientation with respect to its display environment, as indicated above, section 14 is provided with dual insertion means extending into the ground. It will be understood therefore that the mounting 10 should not be rotatable anywhere between the multi-pronged base assembly 30 and the upper flag holding section 16. With the usual single section mounting stake, this is not a problem. However, when the mounting stake or support is made in several sections, if such sections of the stake are rotatable with respect to each other, directionality maintenance of the decorative flag may be very adversely effected.

When presented with interconnecting sections and particularly in the case of overlapping interconnecting sections, however, rotational movement between the sections is not unusual unless steps are taken to maintain rotational integrity between the sections. In the past, as discussed above maintenance of rotational alignment may be achieved by the use of detents mounted upon one of the interconnecting units and partially inserted into the other from the side or sides. When the two sections are aligned both rotationally and longitudinally, and the detent passed through both, the pieces are placed in both rotational and longitudinal alignment with each other as long as the detent is maintained in place. Various types of spring detents have been made. However, the use of detents has been found to be unsatisfactory in preventing rotational movement of flag support section 16. In addition, the mere fact that detents comprise a separate piece or section means that they represent an additional cost to manufacture and incorporate into a product.

The present inventor, in considering the use of detents, unexpectedly discovered that for use in aligning radial elements and preventing them from rotation with respect to each other, the swaged sections of shafts 13 and 15 could be provided with an axial groove extending substantially the length of the swaged section, while the open ends of shafts 13 and 26 in which the swaged sections are received could be provided with a matching axial groove, in a manner such that when the sections are joined relative rotation of the joined sections would be very substantially impeded, but also insertion of the swaged sections into the tubular open ends would not be seriously interfered with or rendered unacceptably difficult. More particularly, it has been found by the present inventor that if a single axial groove is made in the outer surface of a reduced or necked down portion of the end of a tubular construction intended to fit into an unswaged or unreduced open end of a second section of another tubular construction, and a similar single axial groove is made in the outer surface of the unswaged or unreduced open end of the second section, a surprisingly tight and effective joint for substantially preventing rotational movement between the two sections under any normal wind or other atmospheric conditions is formed. This is exactly what one wishes with respect to reaction to wind force or moving atmospheric masses where wind forces may be effectively resisted. The present inventor has therefore unexpectedly and providentially found a new arrangement and means for preventing rotation of one possible or provisionally rotational member with respect to a coaxially mounted member which is both significantly more convenient and less costly than more conventional means.

In a preferred embodiment, an axial groove 70 (FIG. 2) is provided on swaged section 50 of second end 24 of shaft 13 comprising center section 12. In addition, an axial groove 72 is provided on swaged section 54 of upper end 20 of shaft 15 of ground engaging section 14. Axial grooves 70 and 72 extend from the outer edge of swaged sections 50 and 54 inwardly for at least a substantial length of the swaged sections. In one embodiment, the axial grooves 70 and 72 are at least one inch long, and in another embodiment axial grooves 70 and 72 are about two inches long.

Referring now to FIG. 4, another axial groove 80 is provided extending inwardly from open end 52 of shaft 26 of flag mounting section 16. In addition, as shown in FIG. 2, another axial groove 82 is provided extending inwardly from open end 56 of shaft 13 of center section 12. Thus, upon assembling flag mounting 10, swaged section 50 on shaft 13 of center section 12 is inserted in open end 52 of shaft 26 of flag support section 16, with axial groove 70 on shaft 13 being aligned to fit with axial groove 80 of shaft 26. Similarly, swaged section 54 on shaft 15 of ground engaging section 14 is inserted in open end 56 of shaft 13 of center section 12, with axial groove 72 on shaft 15 being aligned to fit with axial groove 82 of shaft 13. In one embodiment, the inner diameter of shafts 26 and 13 is 0.630 inches, and the outer diameter of swaged sections 50 and 54 is about 0.610 inches. This very close tolerance or fit together of the components of the three-piece flag stake of the present invention including the two pairs of single axial ridge connections severely limits the possible amount of rotational movement flag holding section 16 may be subjected to with respect to center section 12, as well as the possible rotational movement of center section 12 with respect to ground engaging section 14.

Furthermore, it has been unexpectedly discovered that provision of single axial groove pairs on the swaged section and mating tubular section results in a significantly smaller degree of rotation between joined sections than is achieved if two or more axial grooves, or double axial groove pairs, are provided. This may seem counterintuitive, since the double axial groove pairs provide more surface area contact at the grooves than single pairs, which as a result should allow the connections to withstand higher torsional forces. However, in order to provide double axial groove pairs, the tolerances of the connections must be loosened up to ensure a clearance fit between the inner and outer tubes. This loosened tolerance results in a greater degree of free rotation at the connections, which in turn results in undesired high acceleration impacts between mating ridges in high wind conditions. Tests have shown that the single ridge design allows for less than one-third the free rotation than either a double ridge design or a spring loaded button design.

FIGS. 5 and 6 illustrate one embodiment of the axial grooves in accordance with the present invention provided on a necked down or swaged portion of a structural tube (FIG. 5) adjacent to and ready for insertion into a complementary open end of structural tube of the same size tube (FIG. 6). More particularly, FIG. 5 illustrates a swaged section of the shaft of flag mounting 10, which can be either swaged section 50 on second end 24 of shaft 13, or swaged section 54 on upper end 20 of shaft 15. As will be evident from the cross-sectional view in FIG. 5A taken in the direction of the arrows shown in FIG. 5, axial grooves 70, 72 on swaged sections 50, 54 have a substantial V-shape that extends inwardly from the outer surface of the swaged sections. Similarly, as shown in FIG. 6 and the cross-sectional view in FIG. 6A taken in the direction of the arrows shown in FIG. 6, first end 22 and open end 52 of shaft sections 13 and 26 incorporate V-shaped axial grooves 82 and 80, respectively. It will be understood that the axial grooves shown in FIGS. 5 and 6 may have a slightly rounded or U-shape as opposed to a specific V-shape. FIGS. 7 and 8 illustrate another embodiment of the axial grooves in which grooves 70, 72 on swaged sections 50, 54 as well as axial grooves 82, 80 on ends 22, 52 of shaft sections 13, 26 have an even more rounded or oval shape, which is best shown in the cross-sectional view in FIGS. 7A and 8A taken in the direction of the arrows shown in FIGS. 7 and 8, respectively. It will be understood that the axial grooves shown may also be provided in additional shapes while still falling within the intended scope of the invention as long as they provide the same acceptably close fit or tolerance between the swaged portion of one shaft section and the open end of an adjoining shaft section in which the swaged section is inserted, including the axial grooves.

When assembled as shown in FIG. 1, center or middle section 12 and lower section 14 may also in one embodiment be secured together with an additional fastener such as a sheet metal screw. Such additional fastener means, although optional, would further prevent the two sections from being disconnected or coming apart particularly when the mounting 10 is lifted and removed from the ground surface by gripping and pulling upwardly quickly on handle 44 and middle section or shaft 15. In one embodiment the fastener is passed through a pair of aligned openings, not shown, in the surfaces of the joined sections. Alternatively, a spring steel button insert may be utilized instead of a screw type fastener. However, these are subject to fatigue failure upon continuous exposure to severe weather, and in addition do not provide as good a moisture seal as a galvanized or brass sheet metal screw type fastener. In another less preferred embodiment, only the connection between the middle and upper sections of the decorative flag mounting of the invention is provided with axial grooves as described above, while the connection between the middle and lower sections is provided with a sheet screw connection. This is because the majority of the rotational force exerted by the laterally extending flag support arm is on the connection between the upper and middle sections of the mounting, while lesser force is exerted on the connection between the middle and lower sections. The upper and middle sections in one embodiment are not provided with a screw fastener connection and may be pulled or slid apart manually. However, the connection is strong enough to prevent the sections from sliding apart as a result of forces exerted on the apparatus under most normal atmospheric conditions, with the possible exception of a severe updraft from a tornado or strong thunderstorm. In addition, since there are no holes in the connection, the connection is completely sealed against moisture, which is preferred. In another embodiment, the flag mounting may be formed in a different number of sections, such as an upper and lower section which would include the axial groove securing arrangement, or in another embodiment more than three sections in which case at least the connection between the flag mounting section and the section to which the flag mounting section is directly connected will incorporate said axial groove connections.

The reduced diameter or cross section end portions of the tubular construction are considered long swages and are formed using a swaging machine of a known type having a working chamber in which the longitudinal sections of the tubular constructions to have a reduction of their cross section are inserted and forming tools are configured to surround the longitudinal section and provide a sufficient compressive force to complete the swaging operation. The axial grooves are formed in the die so the total process only requires a single stage die, which ensures the tightest tolerances between mating sections.

While the invention has been described above in connection with a preferred embodiment of the invention incorporating a tubular mast construction which tubular mast construction has the advantage of lighter weight for the same stiffness and integration of the connections between mast elements and integral connections between such sections, it is possible also to supply the mast elements in the form of solid metal sections connected together by intervening metal sleeve sections. Furthermore, the use of the swaged interconnections having coordinated axial grooves of the invention to prevent rotation of the mast elements with respect to each other can be used within the sleeved connections. Such construction is not as convenient and efficient as with the use of tubular swaged construction, as the resulting structure is heavier while being slightly less sturdy: however it may be useful for smaller garden flag stakes.

Figure 9:
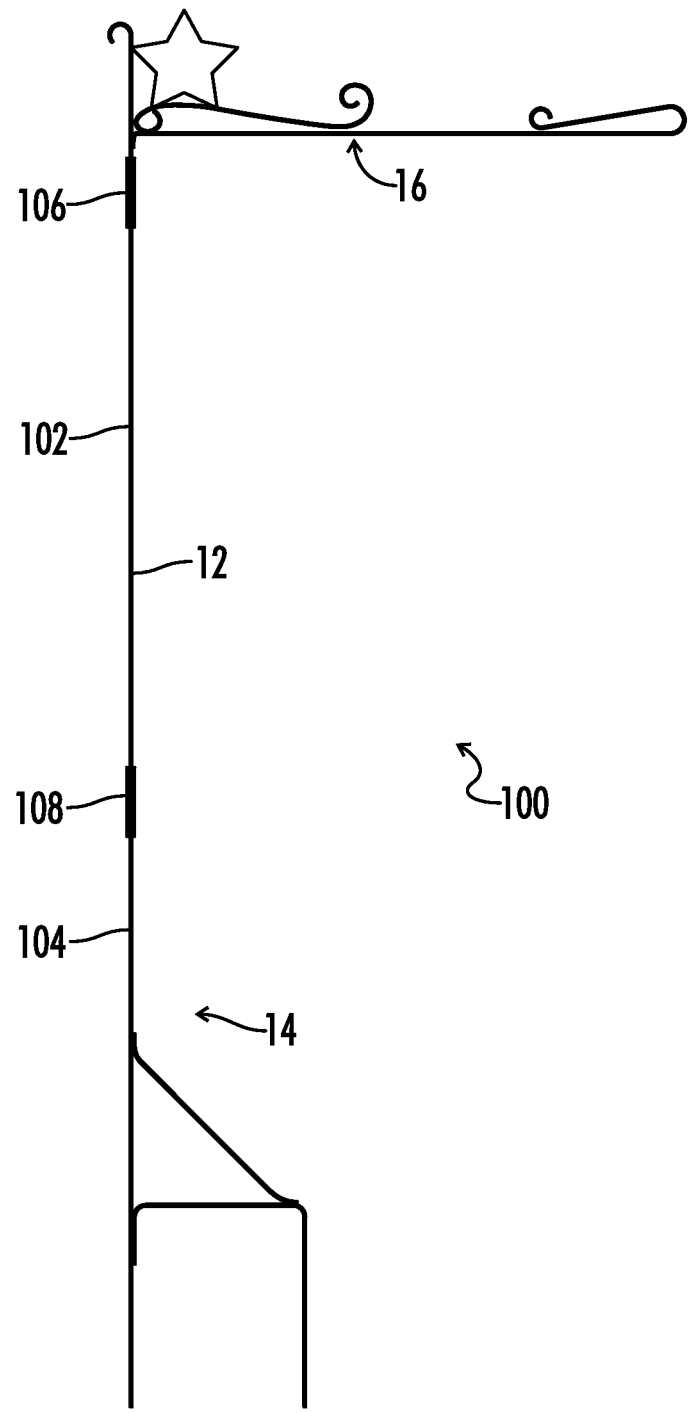
FIG. 9 is an expanded view of another exemplary embodiment of the assembled flag mounting of the invention.

Such an alternative construction is shown in FIG. 9, in which a decorative mast construction 100 similar to that shown in FIG. 1 is shown. It will be recognized that this mast construction is very similar functionally to that shown in the previous drawings or figures, except that shaft sections 102 and 104 are solid structural rod members or mast elements, which are connected together by sleeves 106 and 108 into one end of the supporting mast rod members sections 102 and 104 are inserted and secured, respectively. More particularly, the end sections of the rod elements may be swaged and/or provided with an axial groove prior to being inserted into the sleeves. In addition, the sleeves will also be provided with a single axial groove which is complementary to the axial grooves on the shaft sections. As a result, relative rotation between the rod member or pieces due to the influence of wind and the like is resisted, since the size tolerance between the rod members and sleeves is acceptably close similar to the previously described embodiments. In one arrangement, the sleeve sections are secured to one of the rod sections by welding or the like, so that in the presently described embodiment sleeve section 106 is secured to flag holding section 16, and sleeve section 108 is secured to the lower end of shaft section 102. Flag arm support section 16 is essentially identical to the construction earlier shown in FIG. 1, except for its connection or mounting upon the lower mast sections by sleeve section 108 for receiving the swaged end of rod member 102, rather than receiving a tubular swaged end. Similarly, the construction of ground assembly 30 is the same as previously described except that the assembly is connected by welding to a solid bar structure rather than a tubular structure, and in addition, the inner or first ground engaging rod is an extension of rod member 104 rather than being a separate welded member as in the previous embodiment. It will therefore be recognized that the same diagonal combined brace and handhold section is used as is shown in the earlier tubular assembly of the invention.

While the present invention has been described at considerable length and with some particularly with respect to the several described embodiments, it is not intended that it or its embodiments be limited to any such embodiments as described or of any particular embodiment, but it is to be construed with reference to the appended claims set forth below so as to provide the broadest possible interpretation of such claims in view of the prior art and, therefore, to effectively encompass the intended scope of the invention as a whole.

What is claimed is:

1. A modular mounting for decorative flags comprising:
   a support shaft formed from at least two mutually interfitting shaft sections having matching inner and outer interfitting end surfaces on opposite ends,
   one of said interfitting shaft sections being interengaged with a ground insertion unit incorporating dependent sharpened members adapted for insertion into a ground surface to position the modular mounting as a whole, and
   one of said interfitting shaft sections supporting a perpendicularly extending rod on which a decorative flag may be connected,
   the matching interfitting end surfaces between the interfitting shaft sections supporting said perpendicularly extending rod and another of said shaft sections including a single mating axial groove pair fitting to prevent relative rotation between the shaft sections.

2. A modular mounting for decorative flags in accordance with claim 1 wherein the support shaft is formed of at least a plurality of interconnected tubular members adapted for erection upon a ground surface as a general garden setting insertion unit which supports a recursive decorative flag display support arm extending to one side of the support shaft.

3. A modular mounting for decorative flags in accordance with claim 2 in which the ground insertion unit includes at least two sharpened ground insertion rods secured to the lower end of the support shaft to support the shaft in an upright position when the ground insertion rods are inserted into the ground.

4. A modular mounting for decorative flags in accordance with claim 3 in which the interfitting shaft sections have a mast section and the ground insertion unit is comprised of at least two solid ground insertion rods smaller in diameter than the mast sections and extending downwardly from the tubular support shaft and adapted for insertion into the ground at displaced locations from each other.

5. A modular mounting for decorative flags in accordance with claim 4 in which one ground insertion rod is arranged to extend from an end of the lowest of the at least two interfitting shaft sections.

6. A modular mounting for decorative flags in accordance with claim 5 in which the other ground insertion rod is attached to the lowest shaft section and is extended outwardly from the support shaft a distance of between six and twelve inches where it deviates at a right angle and extends downwardly to a point substantially level with the lowest point of the first ground insertion rod.

7. A modular mounting for decorative flags in accordance with claim 6 additionally comprising a combined brace and handgrip extending between near the location of the right angle downward turn of the second ground insertion rod and the interfitting shaft section at substantially a forty-five degree angle.

8. A modular mounting for decorative flags in accordance with claim 1 in which the at least two interfitting shaft sections are interconnected tubular members, one of said tubular members having a reduced diameter end section adapted to be inserted into the open end of an adjoining tubular member, and in which matching axial grooves are provided on the reduced diameter section and the open end of the adjoining tubular member, whereby when the reduced diameter section is inserted into the open end of the adjoining tubular member rotation between the two sections is substantially impeded but insertion of the reduced diameter end section into the open end of the adjoining tubular member is not substantially interfered with.

9. A modular mounting for decorative flags comprising a combination of solid and tubular components, in which a flag mounting and a ground insertion component are formed of solid components of appropriate gauge for stresses expected to be encountered in a typical garden location, and a supporting shaft is formed of tubular stock provided with a necked down intersecting portion adapted to be inserted within adjacent full diameter sections, said necked down intersecting portion having an axial groove formed in a surface of said portion and a matching axial groove formed in an adjacent full diameter section, said axial groove pairs adapted to substantially inhibit wind induced differential rotation of such intersecting portions.

10. A method of inhibiting rotation between interengaged tubular section for decorative flags comprising the steps of:
    swaging an intersecting surface of adjoining sections where one section is to be inserted into another section,
    forming a single axial groove in the swaged intersecting surface,
    forming a single mating axial groove in the section into which the swaged intersecting surface is to be inserted, and
    inserting the swaged intersecting surface into the adjoining section with the axial groove in alignment to substantially impede rotation between the sections.

11. A sectional mounting for large decorative flags comprising:
    a support shaft formed of at least two partially overlapped shaft sections connectable to each other to form a decorative flag supporting mast assembly,
    a ground support assembly unit incorporating at least two ground insertion rods for partial insertion into a ground surface upon which the support shaft is mounted during use,
    a decorative flag display support arm adapted for support at a substantially right angle orientation to the support shaft, to which support arm a decorative flag may be mounted in a draped display orientation,
    the partially overlapped shaft sections being provided with a single mating axial groove pair formed in overlapping sections to substantially prevent the shaft sections from unimpeded rotation with respect to each other.

12. A display mounting for decorative flags comprising at least two shaft sections, the at least two shaft sections having one or more pairs of inner and outer interfitting end sections, the inner interfitting end section having a reduced diameter formed by a swaging process, and the inner and outer interfitting end sections including a single mating axial groove pair fitting to inhibit relative rotation between the shaft sections.

13. The display mounting of claim 12 additionally comprising a ground engaging assembly including a plurality of spaced apart ground engaging members.

14. The display mounting of claim 13 in which the ground engaging assembly includes a diagonal dual purpose brace and handle member.

15. The display mounting of claim 13 additionally comprising a support for supporting a display attached to the display mounting.

* * * * *